(12) United States Patent
Rode

(10) Patent No.: US 7,195,235 B2
(45) Date of Patent: Mar. 27, 2007

(54) ADJUSTABLE DISC SPRING SYSTEMS AND METHODS

(76) Inventor: John E. Rode, Persse Rd., P.O. Box 1127, Fonda, NY (US) 12068

( * ) Notice: Subject to any disclaimer, the term of this patent is extended or adjusted under 35 U.S.C. 154(b) by 519 days.

(21) Appl. No.: 10/054,253

(22) Filed: Jan. 22, 2002

(65) Prior Publication Data

US 2003/0137089 A1 Jul. 24, 2003

(51) Int. Cl.
*F16F 1/34* (2006.01)
(52) U.S. Cl. ..................................................... 267/161
(58) Field of Classification Search ................. 267/158, 267/159, 160, 161, 162, 163, 164, 165
See application file for complete search history.

(56) References Cited

U.S. PATENT DOCUMENTS

| | | | | |
|---|---|---|---|---|
| 82,276 A | * | 9/1868 | Belleville | ................. 236/26 B |
| 1,826,597 A | * | 10/1931 | Brecht | ........................ 267/162 |
| 2,162,719 A | | 6/1939 | Hay | ............................ 267/162 |
| 2,323,985 A | | 7/1943 | Fausek et al. | ............... 267/162 |
| 3,224,344 A | * | 12/1965 | Baumann et al. | ............... 92/45 |
| 3,394,631 A | * | 7/1968 | Thompson | ...................... 92/46 |
| 3,836,195 A | * | 9/1974 | Teeri | ........................... 267/162 |
| 4,067,585 A | * | 1/1978 | Rode | ............................ 277/379 |
| 4,745,846 A | | 5/1988 | Eickmann | ..................... 91/488 |
| 4,799,654 A | * | 1/1989 | Eickmann | .................... 267/162 |
| 5,222,718 A | * | 6/1993 | Buck | ........................... 267/162 |
| 5,549,397 A | | 8/1996 | Rode | .......................... 384/551 |
| 6,244,751 B1 | | 6/2001 | Rode | .......................... 384/551 |
| 6,314,832 B1 | | 11/2001 | Graber et al. | ................. 74/531 |

FOREIGN PATENT DOCUMENTS

| | | | |
|---|---|---|---|
| DE | 2323642 A | 11/1974 | |
| JP | 52-022648 A | 2/1977 | ................. 267/162 |
| JP | 10-054432 | 2/1998 | |

OTHER PUBLICATIONS

Watson, Best Practice in Disc Spring Design, Industrial Technology (www.industrialtechnology.co.uk/1998/nov/bauer.html) Nov. 1998.
Belleville Disc Springs, Gardner Spring Inc., (www.gardnerspring.com/belleville.html).
Important Information about Disc Springs, Belleville Springs, Ltd., Arthur St., Lakeside, Redd.tch, Worstershire, United Kingdom, www.bellevillesprings.com/disc-springs.html.

* cited by examiner

*Primary Examiner*—Xuan Lan Nguyen
(74) *Attorney, Agent, or Firm*—Heslin Rothenberg Farley & Mesiti P.C.; Nicholas Mesiti, Esq.; Victor A. Cardona, Esq.

(57) ABSTRACT

An adjustable disc spring system includes at least one beveled disc spring axially aligned with the adjustable spacer. The adjustable spacer is compressible in a substantially axial direction relative to the at least one beveled disc spring.

4 Claims, 17 Drawing Sheets

ADJUSTABLE DISC SPRING SYSTEMS AND METHODS

TECHNICAL FIELD

This invention relates, in general to disc springs and more specifically to adjustable disc spring systems and methods for utilizing such systems.

BACKGROUND ART

Disc springs, sometimes referred to as Belleville washers, are conical shaped washers which are designed to receive force in an axial direction. These springs produce small deflections under high loads, as compared to other types of springs. Further, it may be desirable to utilize disc springs in restricted spaces due to their high resilience. However, it is also sometimes desirable to adjust components relative to one another in such restricted spaces, including disc springs used in combination with such components. For example, adjustability may be desirable in a small axial space when adjusting a disc spring relative to a rolling element ball or a tapered roller bearing in order to accommodate axial dimensional variations or tolerances due to manufacturing variations in making the component parts.

Thus, there is a need for an adjustable disc spring systems and methods for adjusting disc spring systems.

SUMMARY OF THE INVENTION

The present invention provides, in a first aspect, an adjustable disc spring system which includes at least one beveled disc spring axially aligned with an adjustable spacer. The adjustable spacer is generally ring shaped and compressible in a substantially axial direction relative to the at least one beveled disc spring. The beveled disc spring is also generally ring shaped. The axial disc spring system may be mounted around a shaft or within a cylindrically shaped cavity. The system may be used where a combination of resilience and adjustability are preferred.

The present invention provides, in a second aspect, an adjustable disc spring system which includes a plurality of beveled disc springs axially aligned with an adjustable spacer. The adjustable spacer is compressible in a substantially axial direction relative to the plurality of beveled disc springs.

The present invention provides, in a third aspect, a method for adjusting a disc spring system. The method includes axially aligning at least one beveled disc spring with an adjustable spacer and compressing the adjustable spacer in a substantial axial direction relative to the at least one beveled disc spring.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

DETAILED DESCRIPTION

In accordance with the principles of the present invention, an adjustable disc spring system having at least one beveled disc spring axially aligned with an adjustable spacer is provided. The adjustable spacer is compressible in a substantially axial direction relative to the at least one beveled disc spring.

Figure 1:
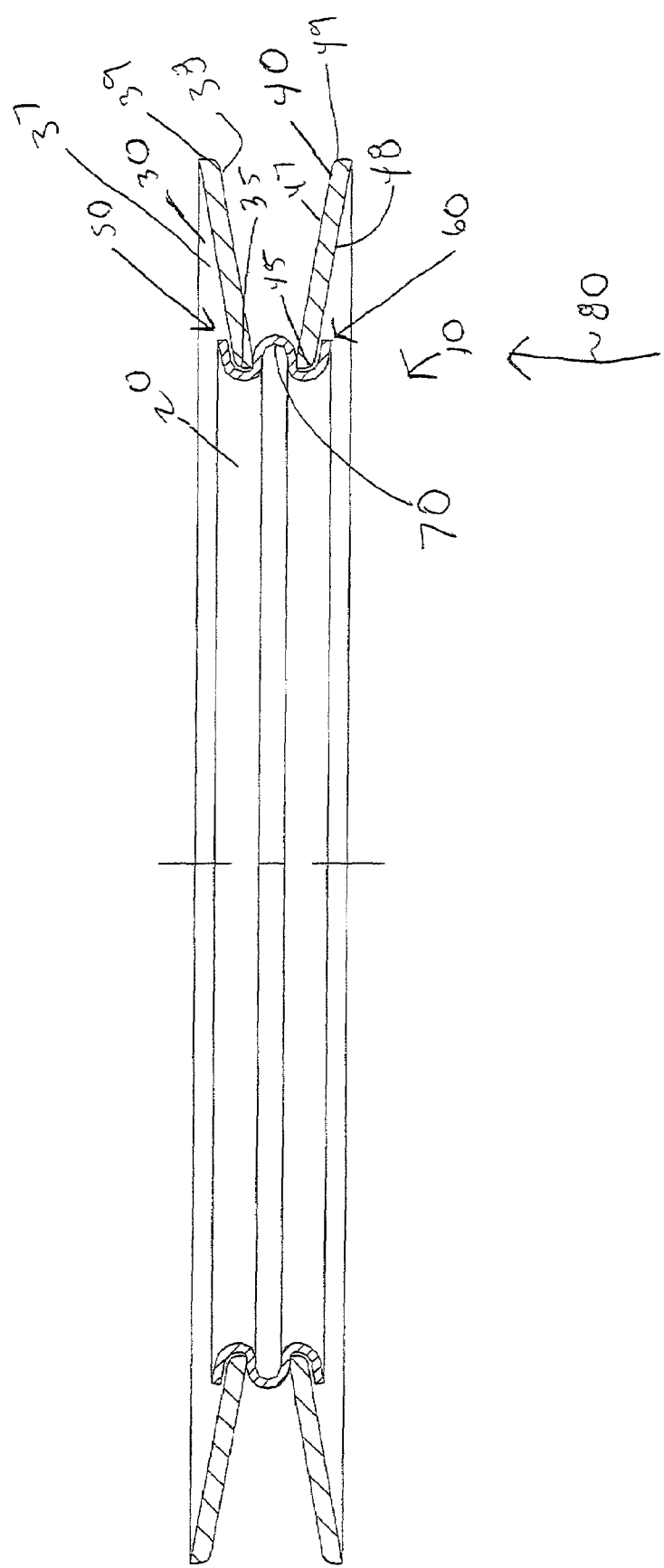
FIG. 1 is a side cross sectional view of an adjustable disc spring system, including two disc springs received by an adjustable spacer, in accordance with the present invention, said discs being concentrically exterior to the adjustable spacer.

In an exemplary embodiment depicted in FIG. 1, a disc spring system 10 includes an adjustable spacer 20, a first beveled disc spring 30 and a second beveled disc spring 40. The disc spring system is shaped in a form of a ring or cylinder which can be mounted within a cylindrically shaped cavity or about a shaft.

Adjustable spacer 20 includes a first entrapping flange 50 for receiving first disc spring 30 and a second entrapping flange 60 for receiving second disc spring 40. First disc spring 30 and second disc spring 40 are substantially circular having openings at their centers to receive adjustable spacer 20. First entrapping flange 50 and second entrapping flange 60 are curved such that their concave interiors abut first disc spring 30 and second disc spring 40. Specifically, first entrapping flange 50 abuts first disc spring 30 on a first proximal end 35, a first bottom side 38, and a first top side 37. Second entrapping flange 60 abuts a second proximal end 45, a second top side 47, and a second bottom side 48 of second disc 40. Further, first disc spring 30 and second disc spring 40 are received in first entrapping flange 50 and second entrapping flange 60, respectively, such that they are axially aligned with adjustable spacer 20.

Also, adjustable spacer 20 includes a compressible portion 70 which is located axially between entrapping flange 50 and entrapping flange 60 while being curved opposite thereto. Compressible portion 70 is adapted to be compressed in a substantially axial direction relative to first disc spring 30 and second disc spring 40, as indicated by an arrow 80. Adjustable spacer 20 is formed to be circular to conform to a first proximal end 35 and a second proximal end 45 of first disc spring 30 and second disc spring 40, respectively. Adjustable spacers of the type usable in the present invention are disclosed in U.S. Pat. No. 4,067,585 to Rode, which is incorporated by reference herein, and made a part of this disclosure. However, other adjustable spacers which are capable of accepting an axial load and are compressible in the axial direction under a certain load will suffice.

First disc spring 30 and second disc spring 40 may be conical shaped washers adapted to receive a stress in the axial direction of arrow 80 to act as compression springs, as will be understood by those skilled in the art. For example, first disc spring 30 and second disc spring 40 may be Belleville washers, as is known by those skilled in the art.

Disc spring system 10 may be received in a restricted space, for example, a cylinder (not shown) or another axial space. A first distal end 39 of first disc spring 30 and a second distal end 49 of second disc spring 40 may be adapted to contact an inner surface of such a cylinder. For example, first distal end 39 and second distal end 49 may be adapted to engage the inner surface to inhibit or prevent movement of first distal end 39 and second distal end 49 in an axial direction relative to the cylinder.

Figure 2:
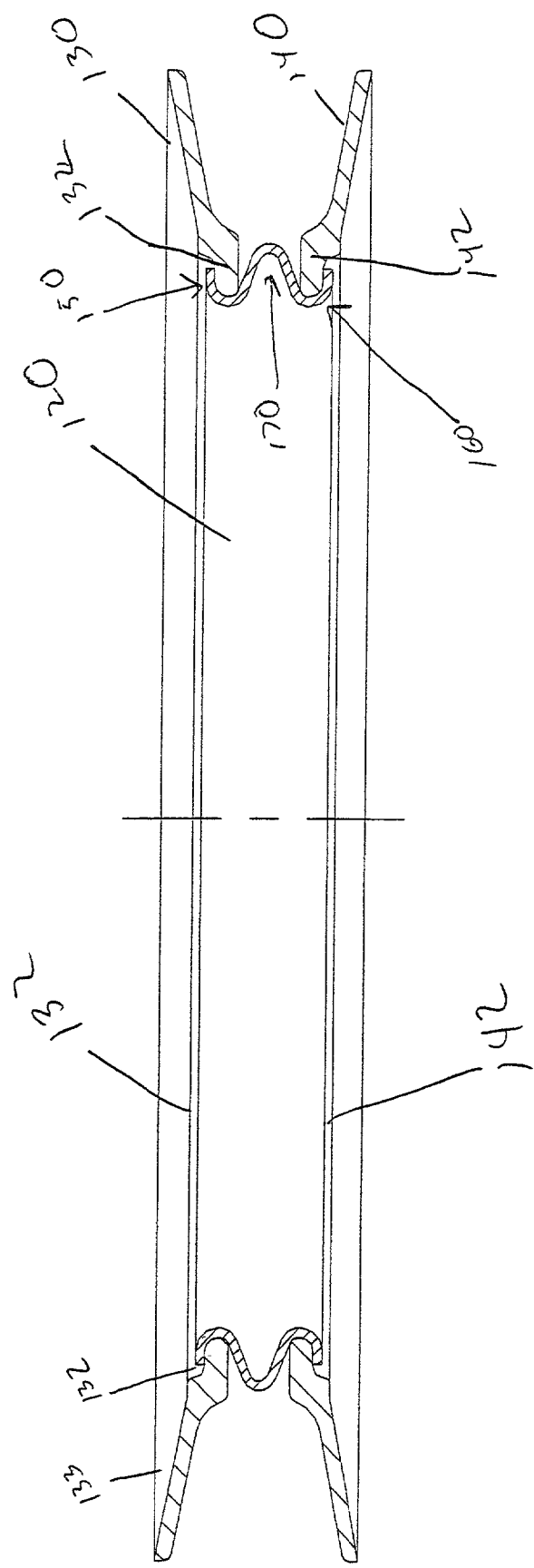
FIG. 2 is a side cross sectional view of another embodiment of an adjustable disc spring system, including two disc springs configured with offsets being received by an adjustable spacer, in accordance with the present invention.

In another embodiment of the present invention, illustrated in FIG. 2, a disc spring system 100 includes a first disc spring 130 and a second disc spring 140 received in entrapping flanges 150 and 160, respectively, of an adjustable spacer 120. First disc spring 130 and second disc spring 140 include a first offset 132 and a second axial offset 142, respectively. The offsets are located on the inner radius of the disc springs. First offset 132 allows adjustable spacer 120 to engage first disc spring 130 interior to an outer axial portion 133 thereof By utilizing an offset, an outer surface of a portion used for attachment (i.e. offset 132) may be located interior to entrapping flange 150 without limiting an elastic portion of first disc spring 130. Specifically, a shape of first disc spring 130 is displaced from being substantially straight by offset 132, but its thickness remains substantially uniform. Thus, the elastic portion of first disc spring 130 is not substantially different from a substantially straight version. Offset 142 has similar advantages. Offsets may be formed in disc springs through programming of CNC lathe machinery to cut disc springs from solid bars of high strength steel materials. Alternatively, offset shaped disc springs may be stamped, as will be evident to those skilled the art.

Figure 3:
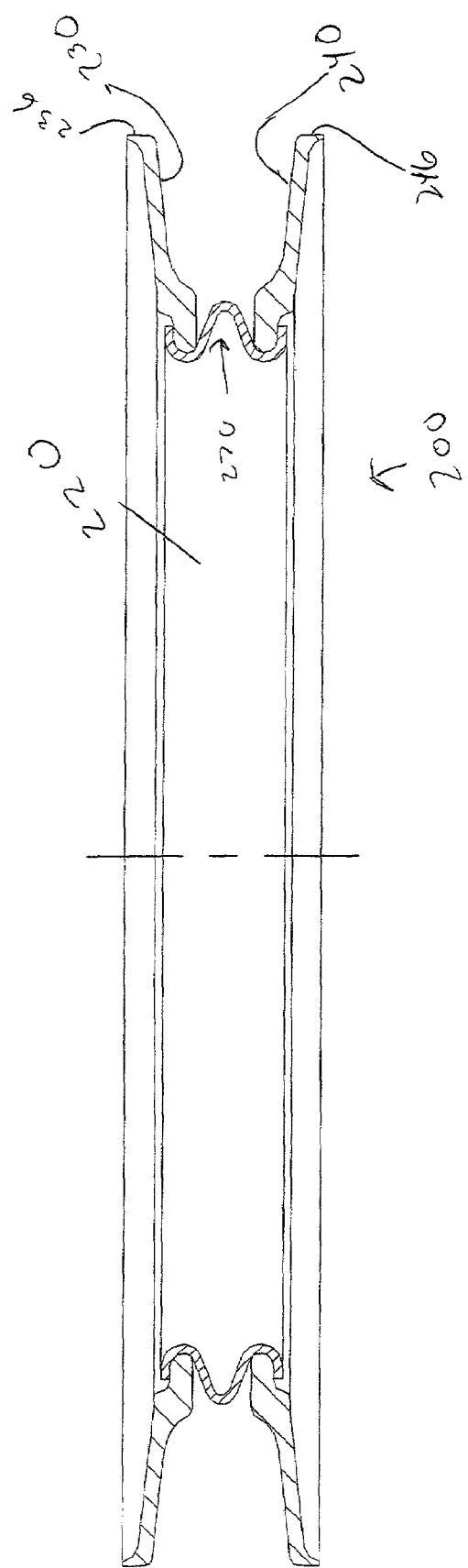
FIG. 3 is yet another embodiment of an adjustable disc spring system, including offsets of two disc springs being received by an adjustable spacer and the disc springs including axially protruding portions, in accordance with the present invention.
Figure 4:
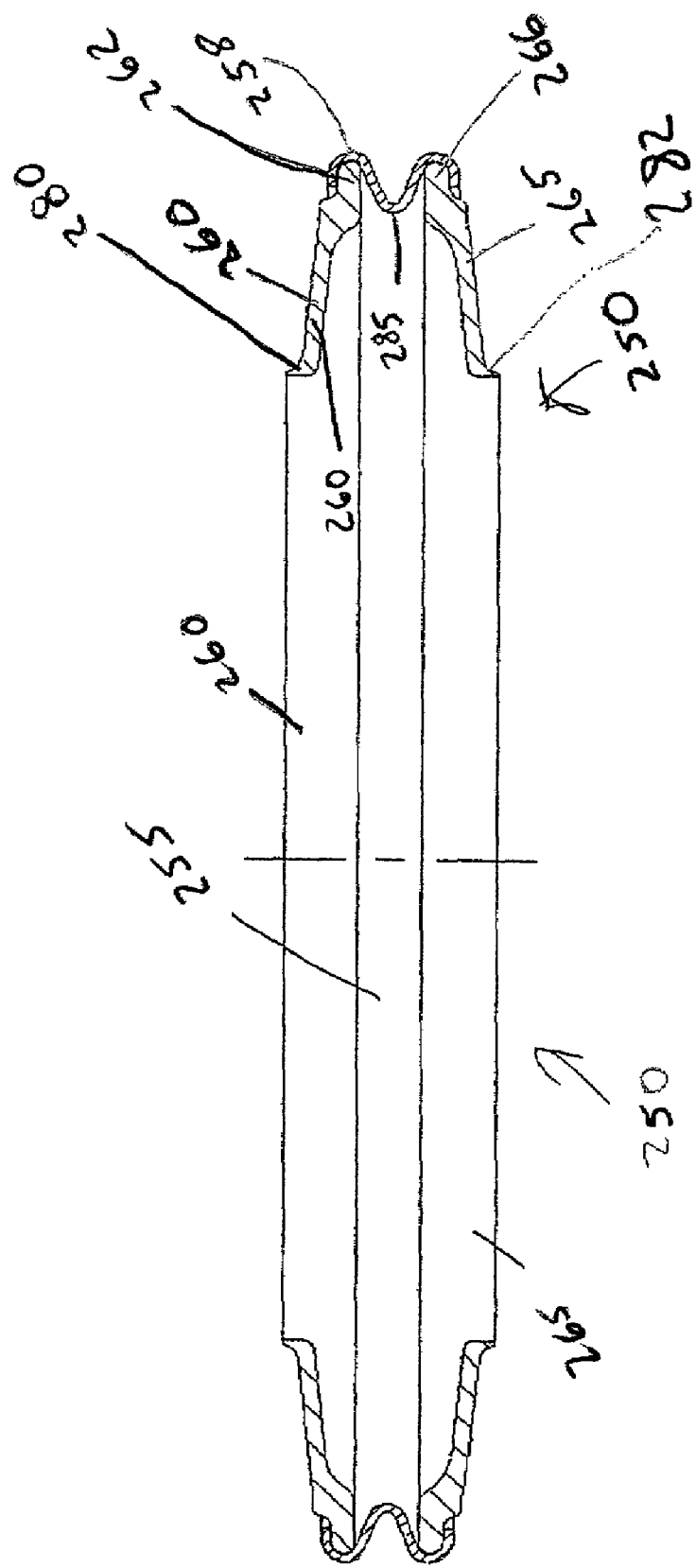
FIG. 4 is yet another embodiment of an adjustable disc spring system, wherein the disc springs are similar to those shown in FIG. 3 except that the disc springs are concentrically interior to the adjustable spacer.
Figure 5:
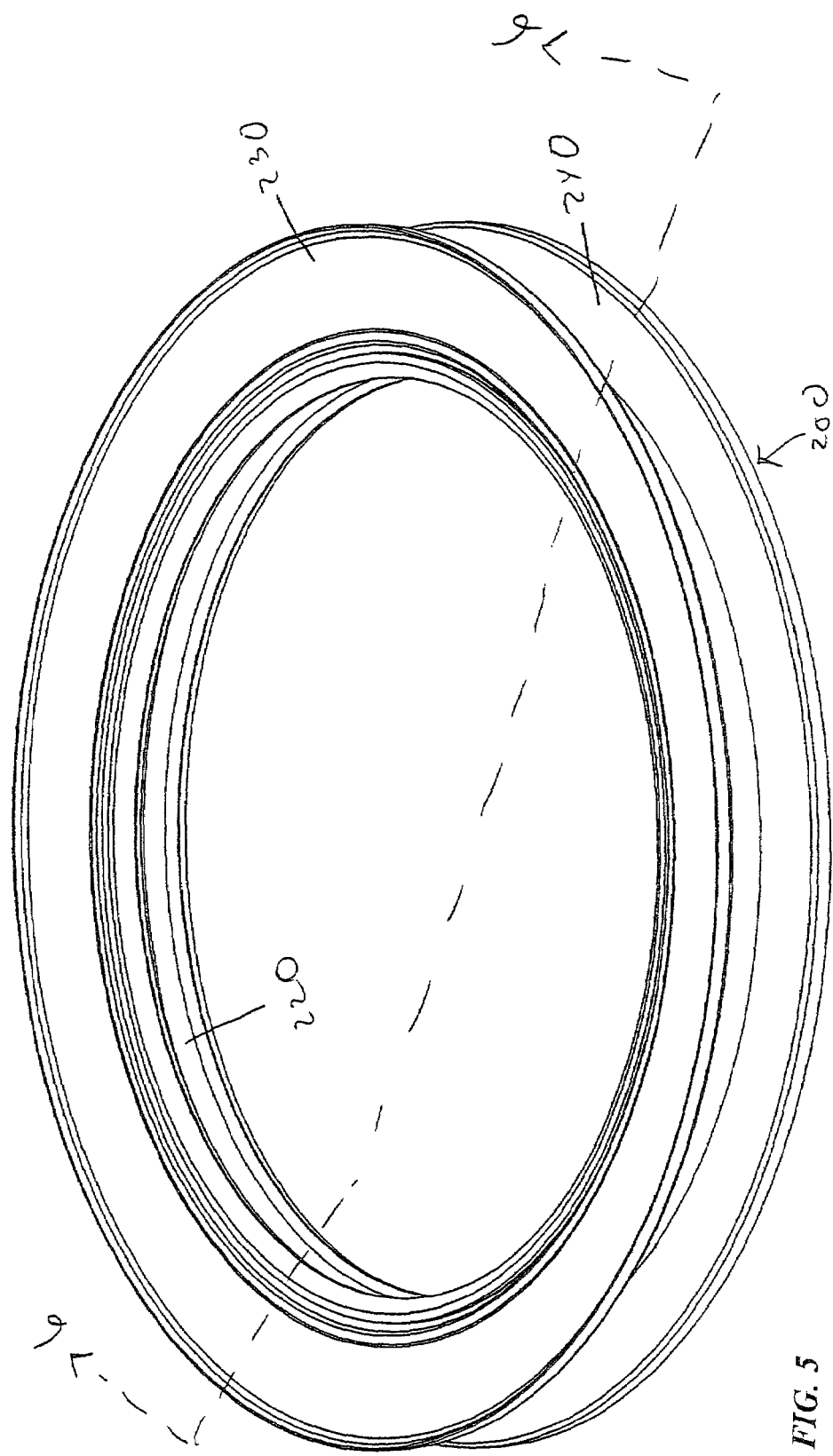
FIG. 5 is a perspective view of the disc spring system of FIG. 3.
Figure 6:
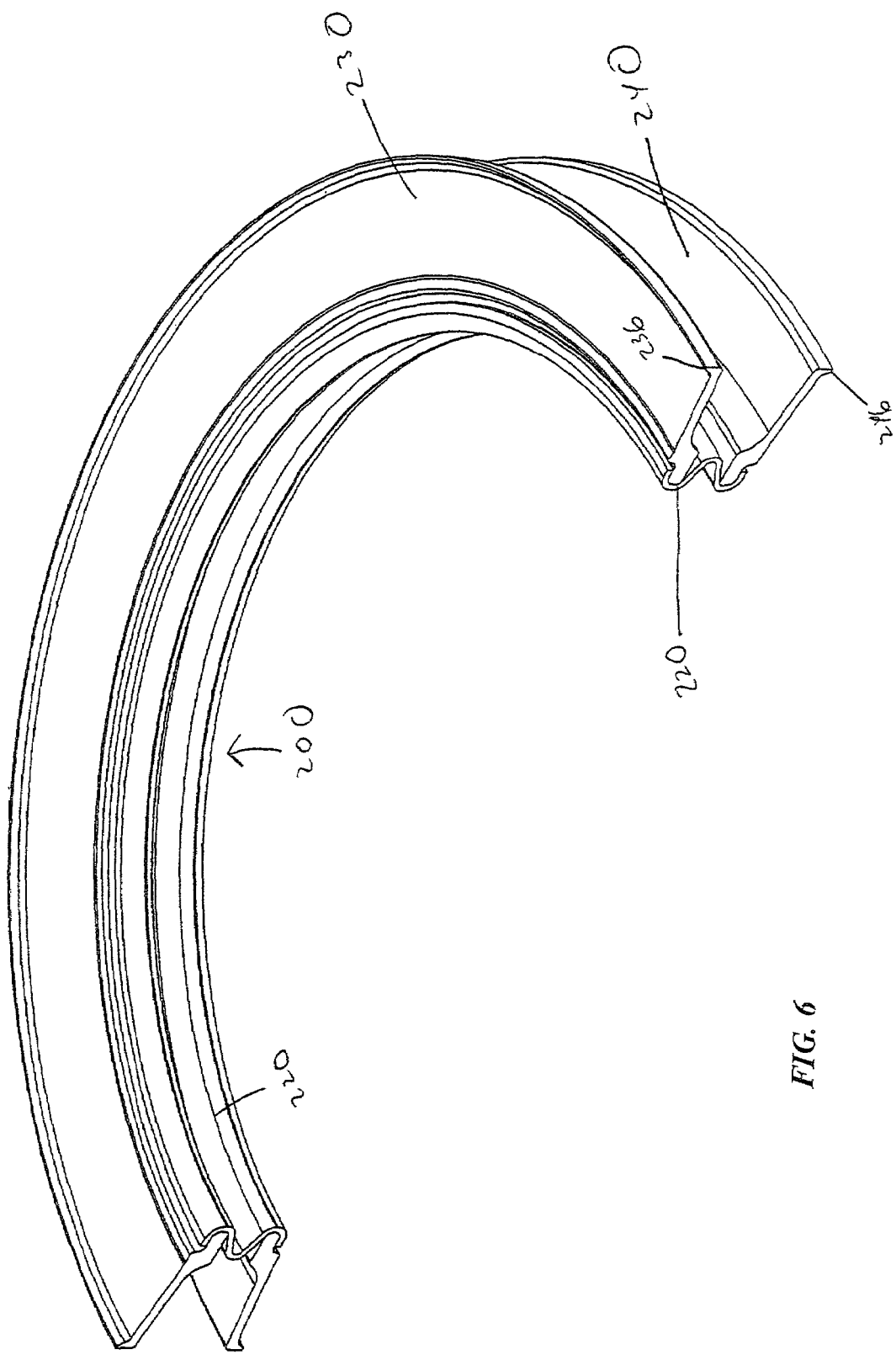
FIG. 6 is a perspective cross-sectional view of the disc spring system of FIG. 5 taken along lines 6—6.

In another example, depicted in FIGS. 3, 5 and 6, a disc spring system 200 includes an adjustable spacer 220 which receives a first disc spring 230 and a second disc spring 240. First disc spring 230 further includes an outwardly (i.e. axially) projecting tip 236 which causes an increase in a total deflection range possible for first disc spring 230. Second disc spring 240 also includes a projecting tip 246 which projects axially but in the opposite direction of the projecting tip of the first disc spring. Such projecting tips allow a maximum spring energy of the disc springs to be utilized because the discs may be first compressed flat and then continued to be compressed elastically to a reverse cone shape from an original free state form. A perspective view of disc spring system 200 is depicted in FIG. 5 which makes evident a ring shaped form of disc spring system 200. A cross-sectional view of disc spring system 200 taken along lines 6—6 of FIG. 5 is depicted in FIG. 6. In another example (not shown), outer surfaces of projecting tips of disc springs may be offset from flat instead of being conically shaped disc springs as depicted in FIGS. 3–6.

In yet another example, depicted in FIG. 4, a disc spring system 250 includes an adjustable spacer 255 which receives a first disc spring 260 and a second disc spring 265 at outer radial edges of the disc springs. Thus, the disc springs are positioned concentrically within the inner diameter of the adjustable spacer. Specifically, adjustable spacer 255 receives disc spring 260 at an offset 262 of first disc spring 260 and adjustable spacer 255 receives second disc spring 265 at a second offset 266. First disc spring 260 may also include an axially projecting tip 280 and second disc spring 265 may include a second projecting tip 282 which projects axially but in the opposite direction of the projecting tip of the first disc spring. As noted above, the projecting tips allow a maximum spring energy of the disc springs to be utilized. Further, the receiving of the disc springs by adjustable spacer 255 at the outer radial edges thereof allow projecting tips 280 and 282 to engage a shaft or other surface at their inner radial ends.

Adjustable spacer 20 (FIG. 1), adjustable spacer 120 (FIG. 2), adjustable spacer 220 (FIG. 3), and adjustable spacer 255 (FIG. 4) are formed of a simple convolute (e.g., a twist or coil) form, as illustrated in FIGS. 1–6. Compressible portion 70, a compressible portion 170 (FIG. 2), a compressible portion 270 (FIG. 3) and a compressible portion 285 (FIG. 4) may be fabricated of a ductile and work hardenable alloy such as 304 stainless-steel or Inconel 625, as is known by those skilled in the art.

Figure 7:
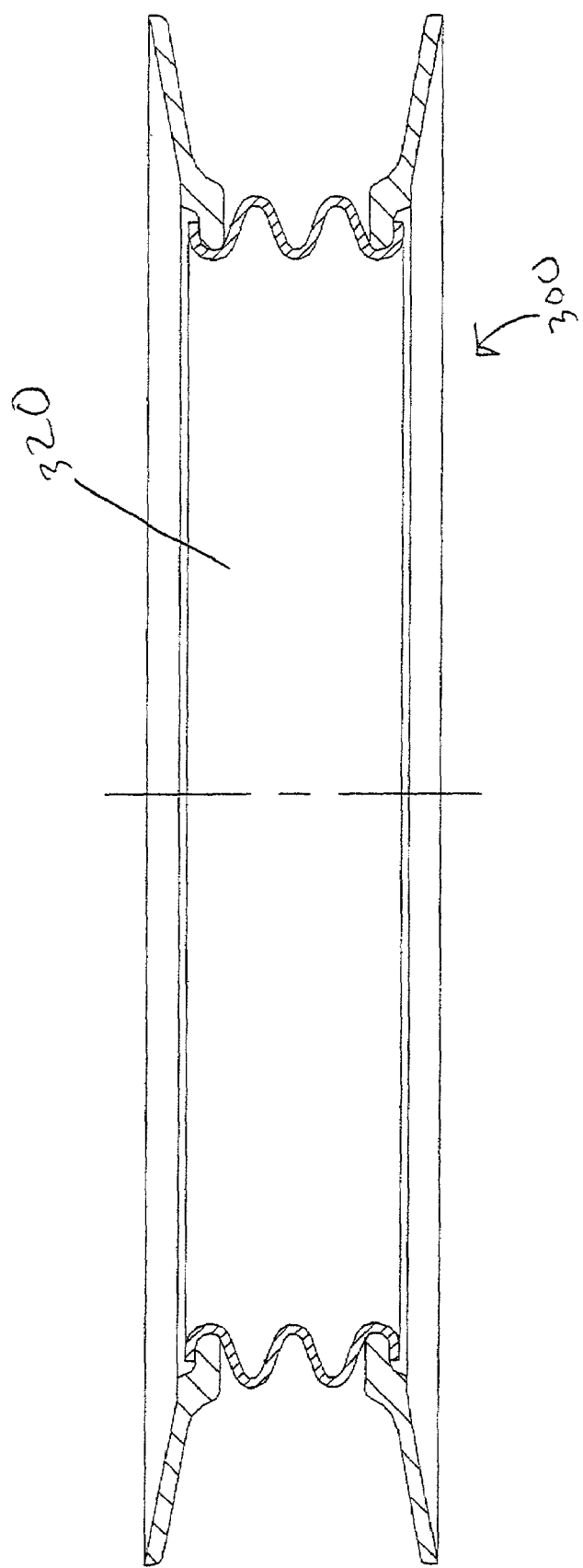
FIG. 7 is a side cross-sectional view of another embodiment of an adjustable disc spring system, two disc springs configured with offsets being received by an adjustable spacer and the adjustable spacer being of a multi-convolute form, in accordance with the present invention.
Figure 9:
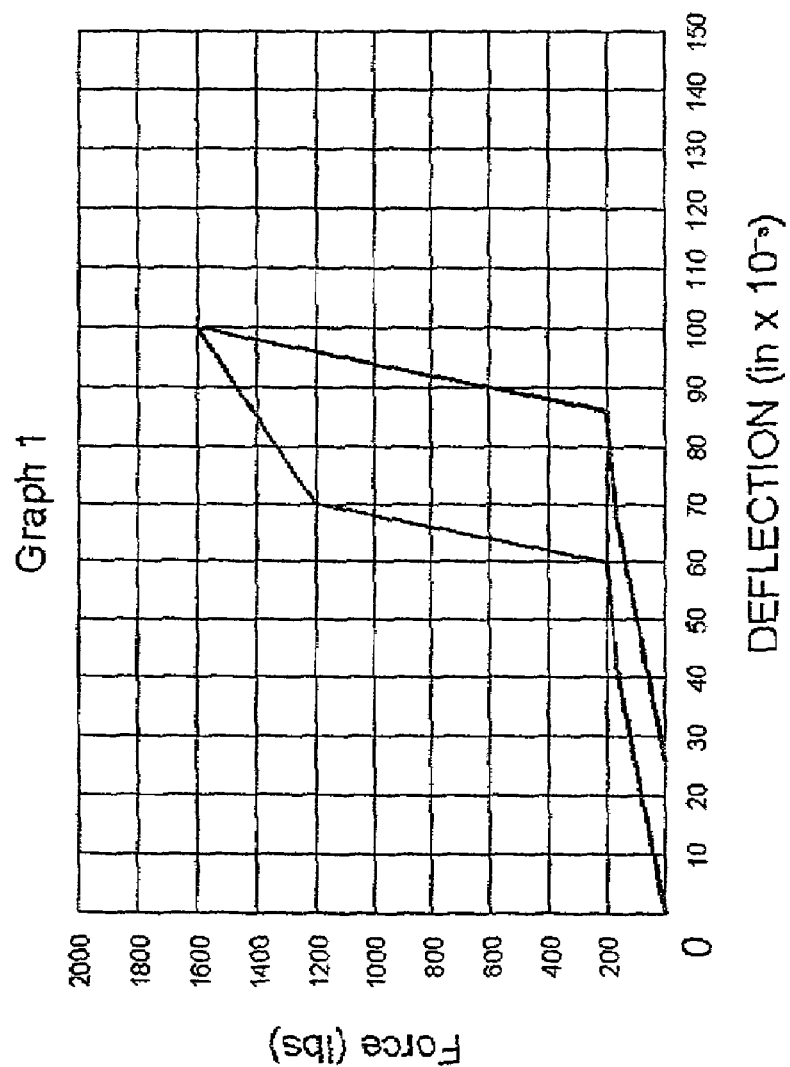
FIG. 9 is a force-deflection graph relating to the disc spring system of FIG. 1.
Figure 10:
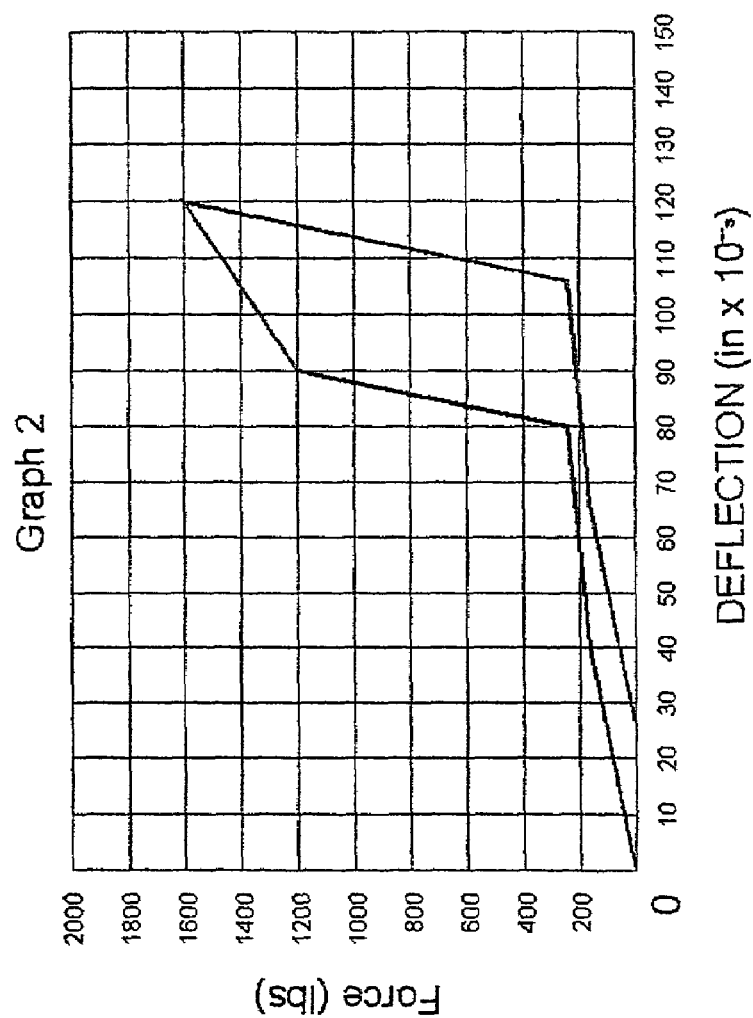
FIG. 10 is a force-deflection graph relating to the disc spring systems of FIGS. 2 and 3.
Figure 11:
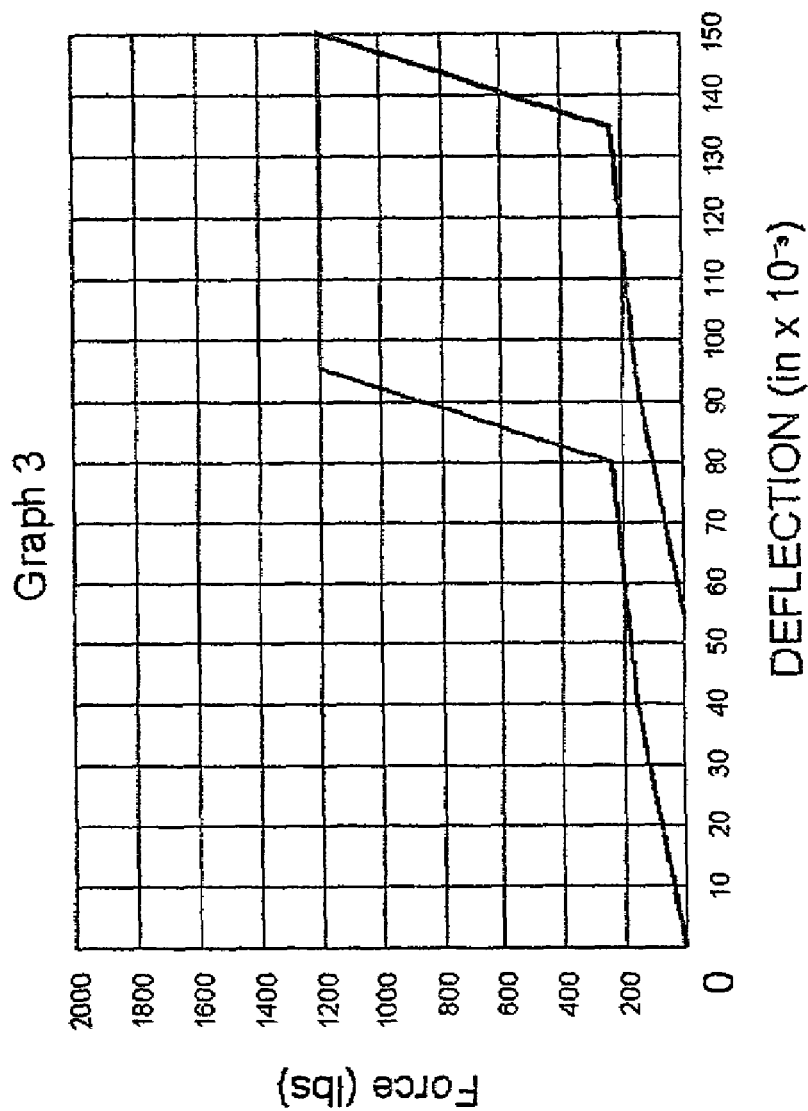
FIG. 11 is a force-deflection graph relating to the disc spring systems of FIG. 7.

An adjustable spacer 320 of a disc spring system 300 has a multi-convolute form, as depicted in FIG. 7. The multi-convolute nature of this spacer allows it to behave in a more predictable manner during compression, as compared to the simple convolute form described above. Further, a force-deflection curve of the multi-convolute form is flattened as compared to the simple convolute form, as will be evident from FIGS. 9–11. Specifically, FIG. 9 depicts a force-deflection curve for disc spring system 10 (FIG. 1) while FIG. 10 depicts a force-deflection curve for disc spring system 100 (FIG. 2) and disc spring system 200 (FIGS. 3–6). FIG. 11 depicts a force-deflection curve for disc spring system 300 wherein a constant rate of deflection at a constant force (i.e. 1200 pounds) is evident. Therefore, deflection curves depict the response of the system to an axial force applied to, for example, a flat plate placed perpendicular to the central axis. In each of the force-deflection curves, at relatively low forces the disc spring accounts for a relatively high deflection. At increased forces, e.g., 200 lbs. and higher in FIG. 9, much less deflection occurs due to compression of the adjustable spacer. Once the spacer has been fully compressed, e.g., 1,200 lbs., in FIG. 9, additional forces may result in higher rates of deflection due to the adjustable spacer. After the maximum deflection of the combination is reached, reduction of the force reduces the deflection. However, since the spacer is adjustable, when no force is applied the deflection is not zero due to the prior compressing of the adjustable spacer. By varying the shape and configuration of the disc spring, the higher rates of deflection within the force-deflection curves can be varied. Also, by varying the configuration of the adjustable spacer, the low rates of deflection and compressibility of the combination can be varied.

Figure 12:
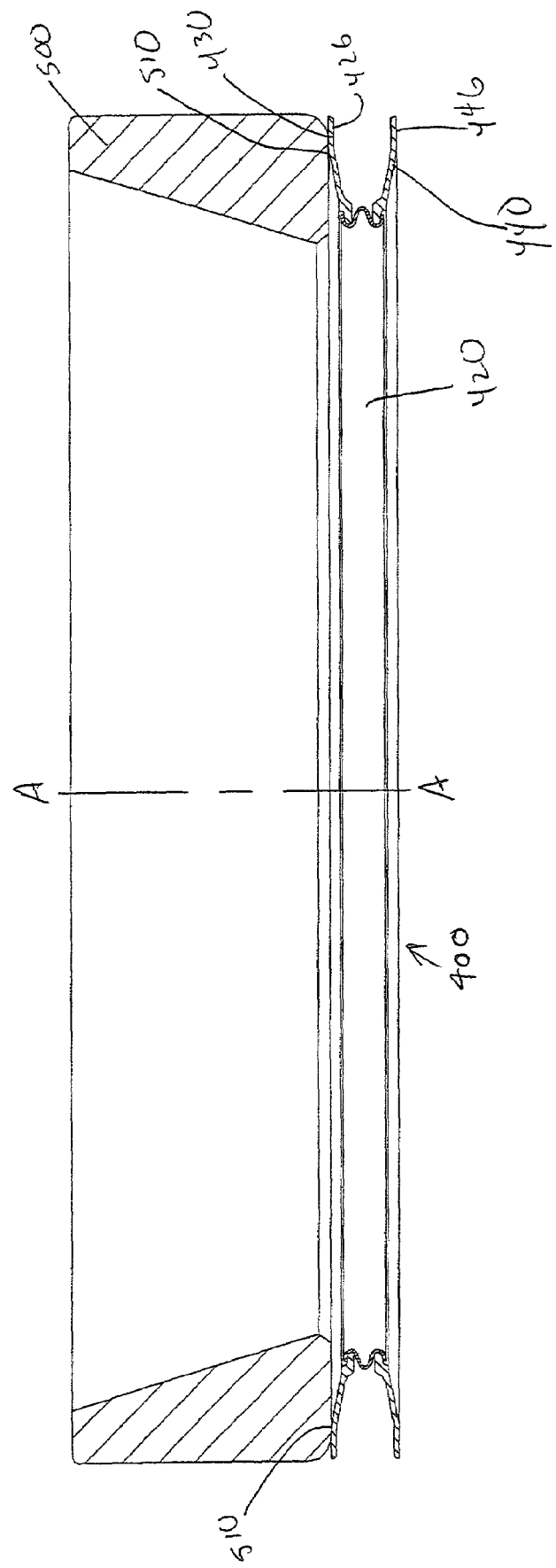
FIG. 12 is a side cross-sectional view of another embodiment of an adjustable spring system having straight radial portions in combination with a tapered roller bearing.

This may be particularly important when utilizing an adjustable spacer 420 of a disc spring system 400 to adjust a set of rolling element ball or tapered roller bearings 500, for example, as depicted in FIG. 12. Particularly, it is desirable to adjust tapered roller bearings in fine increments to achieve a precise adjustment. Thus, it is desirable to utilize a spacer which deflects at a constant rate at a particular force, because this predictability aids in the fine adjustment. Referring to FIG. 12, connected to adjustable spacer 420 are a first disc spring 430 and a second disc spring 440, which also include a first straight radial extension 426 and a second straight radial extension 446, respectively Each radial extension extends substantially perpendicular from the central axis A—A. Thus, a force from tapered roller bearing outer race 500 may be applied radially interior to first disc spring 430 and second disc spring 440 via first straight radial extension 436 and second straight radial extension 446 by flat portion 510 above a bearing face which is interior to a corner radius of the bearing. Moreover, in this situation it may be advantageous to engage a multi-convolute spacer, such as in disc spring system 300 (FIG. 7) with such tapered roller bearings due to the more predictable nature of compression thereof, as described above. Further, disc spring system 400 or a similar disc spring system using a multi-convolute spacer may be stacked with other disc spring systems or components to achieve a desired deflection and/or adjustability.

Figure 8:
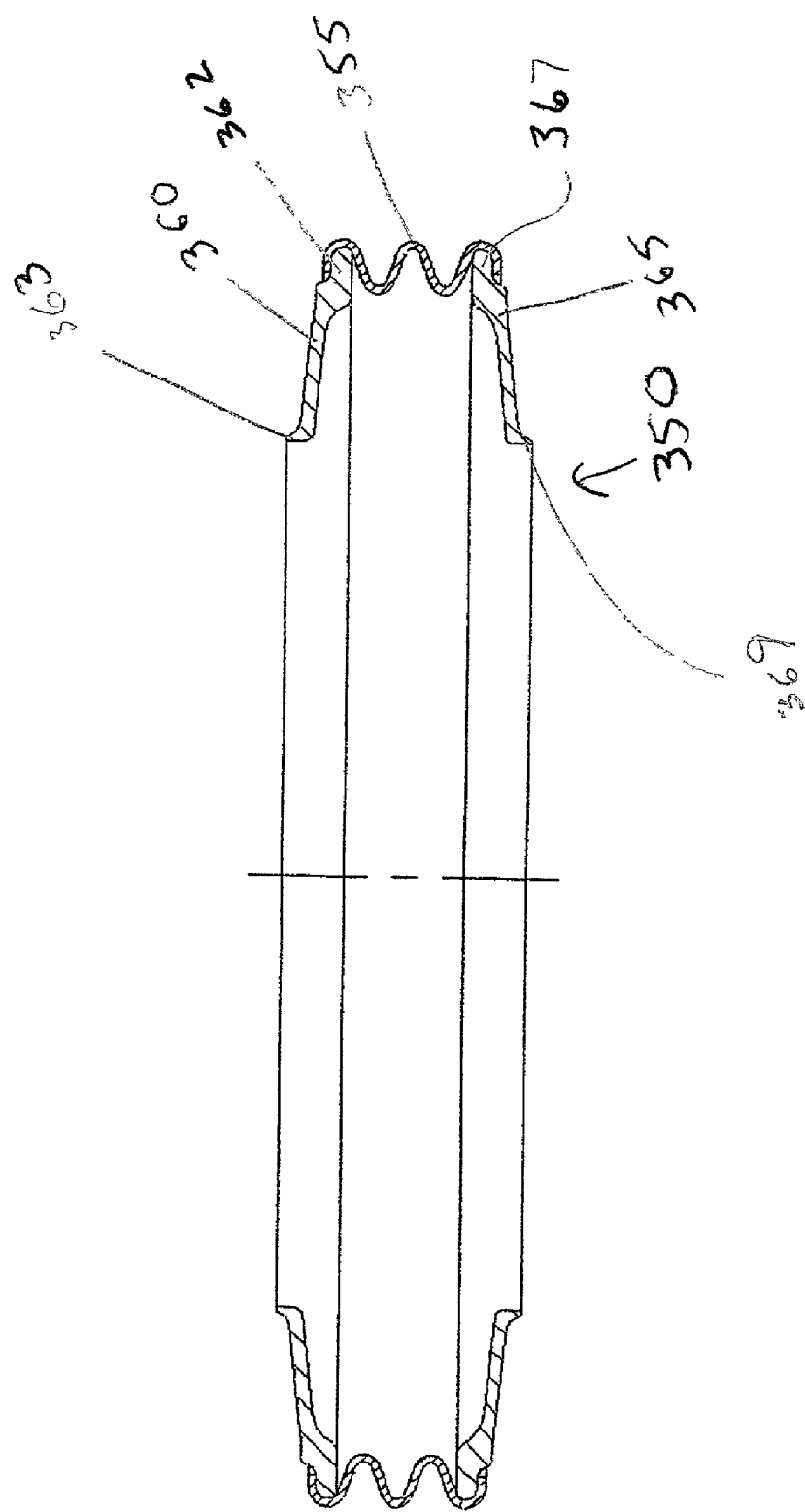
FIG. 8 is a side cross-sectional view of another embodiment of the disc spring system as in FIG. 7 except that the two disc springs are concentrically interior to the multi-convolute form adjustable spacer.

In another embodiment, FIG. 8 depicts an adjustable disc spring system 350 having an adjustable spacer 355 which receives a first disc spring 360 and a second disc spring 365 at outer radial ends thereof Thus, the disc springs are positioned concentrically within the inner diameter of the adjustable spacer. Specifically, adjustable spacer 355 receives first disc spring 360 at an offset 362 thereof and receives second disc spring 365 at a second offset 367 thereof. As noted above for disc spring system 250 (FIG. 4), first disc spring 360 includes an outer projecting tip 363 and second disc spring 365 includes a second axially projecting tip 369. These projecting tips may engage a shaft or other surface interior to disc spring system 350. Adjustable spacer 355 has a multi-convolute form, similar to adjustable spacer 320. Thus, adjustable spacer 355 also has deflection and adjustability properties similar to adjustable spacer 355, as described above.

Figure 13:
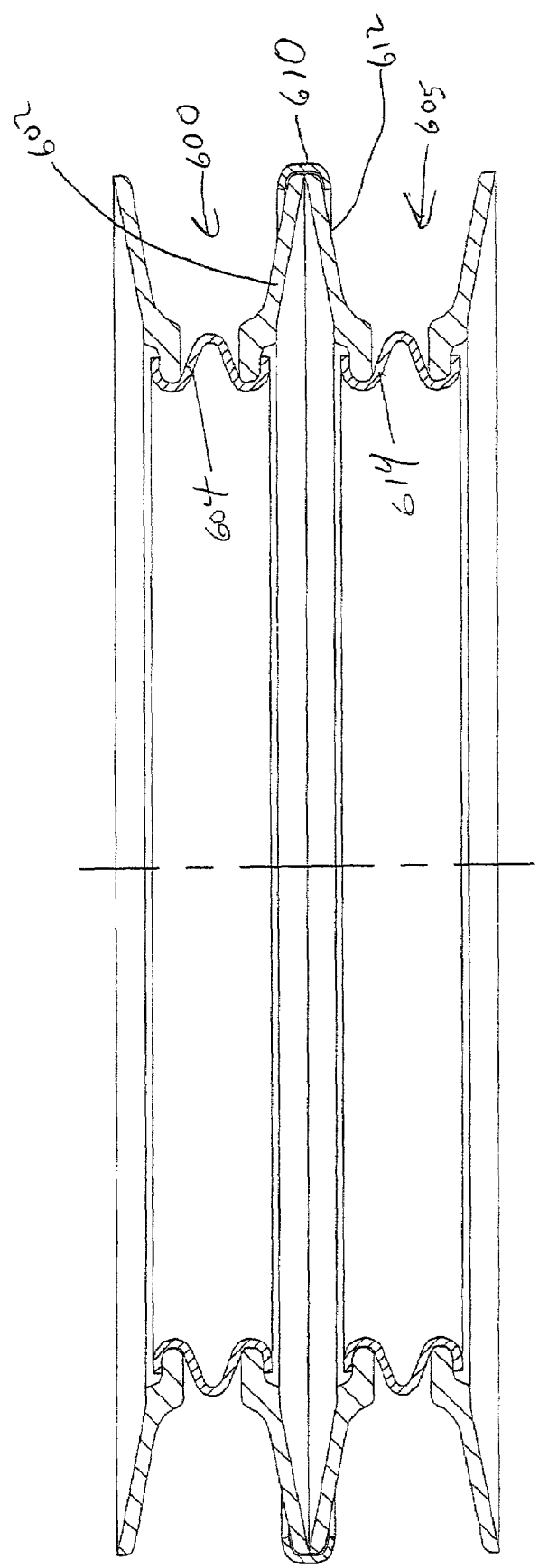
FIG. 13 is an embodiment of two adjustable disc spring systems connected by a connecting member, in accordance with the present invention.

In another example, FIG. 13 depicts a first disc spring system 600 and a second disc spring system 605, similar to disc spring system 10 depicted in FIG. 1, connected by a connecting member 610. Connecting member 610 may be a simple roll formed "C" sectionally shaped ring connector for example, as will be understood by those skilled in the art. The connection of a bottom disc spring 602 of first disc spring system 600 and a top disc spring 612 of second disc spring system 605 inhibits bottom disc spring 602 and top disc spring 612 from separating from one another. A more resilient contact is provided between disc spring system 600 and disc spring system 605 with an inner surface (not shown) of a cylinder, for example. Thus, first disc spring system 600 and second disc spring system 605 are maintained axially aligned during compression of a first adjustable spacer 604 and a second adjustable spacer 614. Further, the use of one or more connecting members similar to connecting member 610 facilitates stacking of multiple disc spring systems, such as first disc spring system 600 and second disc spring system 605. As noted above, the stacking of multiple disc spring systems allows one to more precisely select the amount of deflection and adjustability desired in a particular arrangement of disc springs and other components. Further, the connection of disc springs to each other, such as with connecting member 610, allows a plurality of disc springs to act as a unit and reduces a risk of disc springs slipping past one another or otherwise failing.

Figure 14:
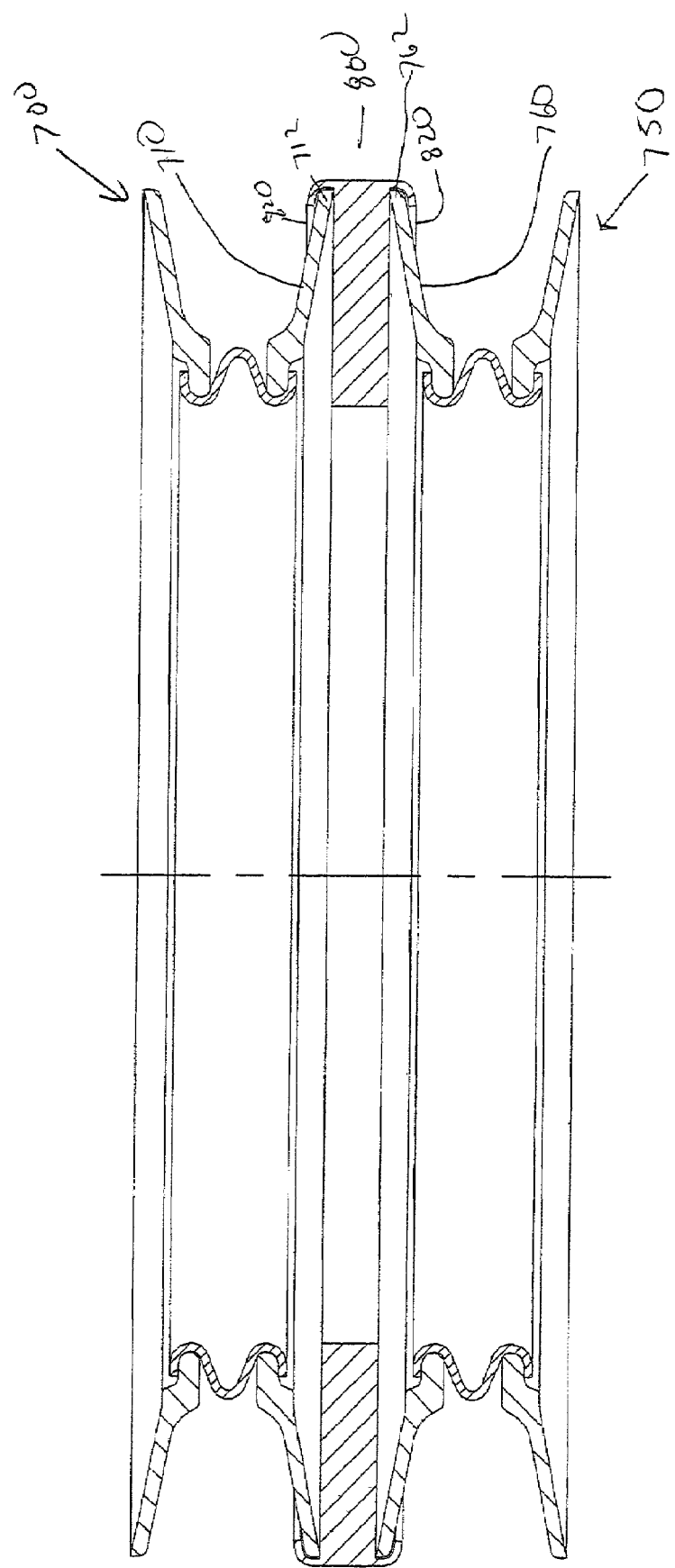
FIG. 14 is an embodiment of two adjustable disc spring systems connected by a connecting washer, in accordance with the present invention.
Figure 15:
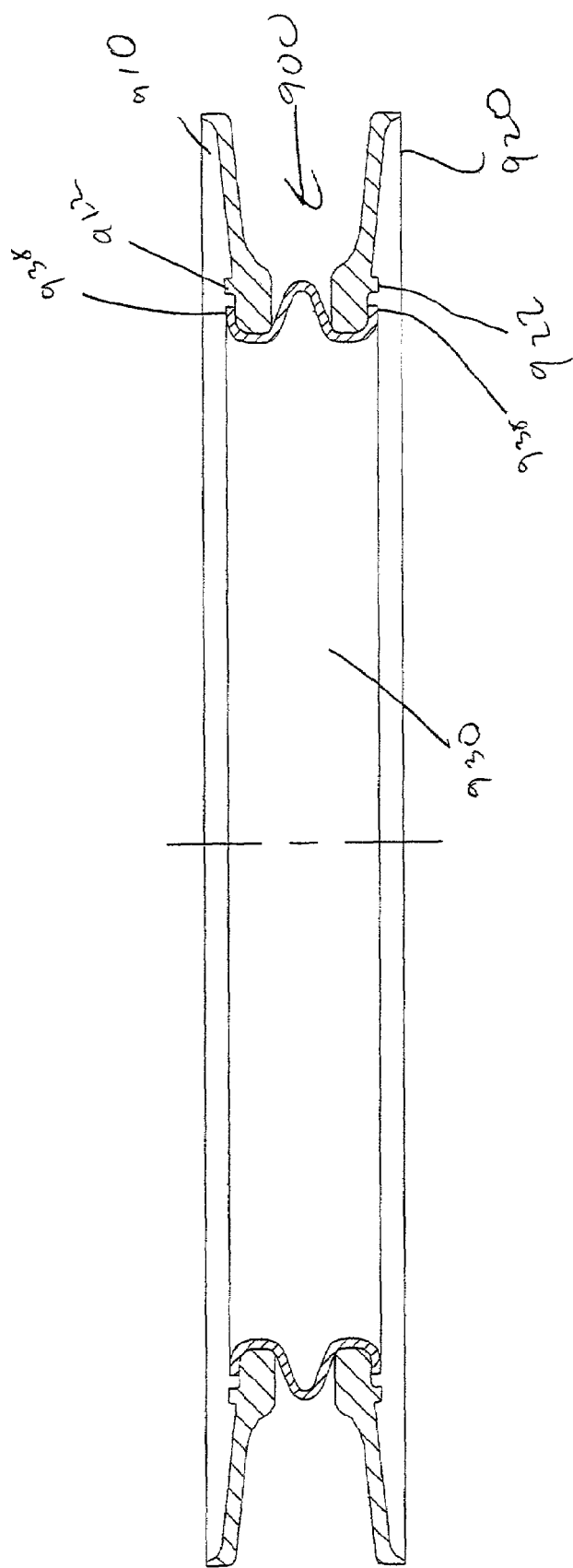
FIG. 15 is another embodiment of an adjustable disc spring system, including two disc springs having deflection limiting stops, said springs being received by an adjustable spacer, in accordance with the present invention.

FIG. 14 illustrates a first disc spring system 700 connected to a second disc spring system 750 by a connecting washer 800. Connecting washer 800 includes axially projecting thin cylinder ends 820 which are roll-formed over outer edges of a bottom disc spring 710 of first disc spring system 700 and a top disc spring 760 of second disc spring system 750, for example. Connecting washer 800 thus inhibits movement of a distal end 712 of bottom disc spring 710 and a distal end 762 of top disc spring 760 in an axial direction. Thus, over-stressing of bottom disc spring 710 and top disc spring 760 is limited and alignment of the discs is maintained, as will be understood by those skilled in the art. As noted above for connecting member 610, the use of connecting washer 800 facilitates stacking of disc spring systems thus allowing for selectability and variability in deflection and adjustability, as desired. Further, additional deflection resistance may be provided by connecting washer 800 itself FIG. 15 depicts an example of a disc spring system 900 which includes a first spring disc 910 and a second disc spring 920 received by an adjustable spacer 930. Also, first disc spring 910 includes a deflection limiting stop 912 and second disc spring 920 includes a deflection limiting stop 922. Deflection limiting stop 912 and deflection limiting stop 922 prevent over-stressing of first disc spring 910 and second disc spring 920 by preventing movement of distal end 935 of adjustable spacer 930 past the deflection limiting stops during compression of adjustable spacer 930.

Figure 16:
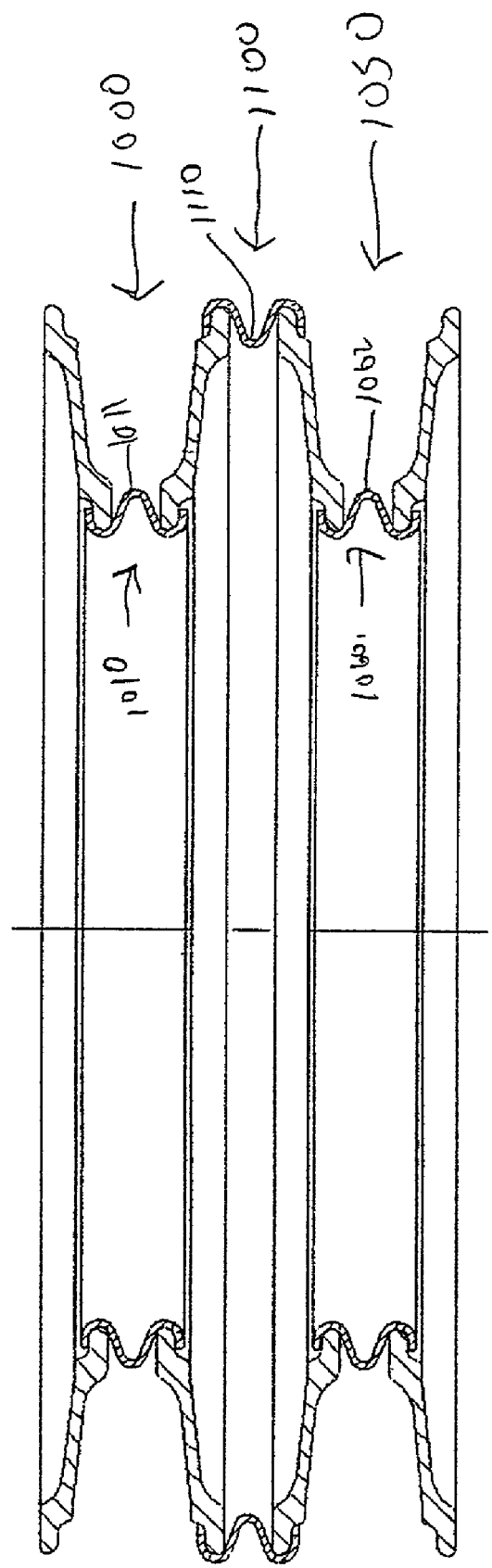
FIG. 16 is an embodiment of two adjustable disc spring systems connected by an adjustable spacer, in accordance with the present invention.

In another example, as depicted in FIG. 16, a first disc spring system 1000 is connected to a second disc spring system 1050 by an adjustable spacer 1100. First disc spring system 1000 includes a first adjustable spacer 1010 and second disc spring 1050 includes a second adjustable spacer 1060 which are aligned substantially parallel to adjustable spacer 1100, that is, they are aligned to be compressed in an axial direction. Specifically, a compressible portion 1011 of first spring system 1000, a second compressible portion 1062 of second disc spring system 1050, and a third compressible portion 1110 of adjustable spacer 1100 are adapted to be compressed in the axial direction. For example, by utilizing three adjustable spacers in this manner, disc spring system 1000 and disc spring system 1050 may be held substantially parallel to one another as adjustable spacer 1010, adjustable spacer 1060, and adjustable spacer 1100 are compressed to adjust the disc springs relative to one another.

Another embodiment of the present invention includes a first disc spring system 1200 and a second disc spring system

Figure 17:
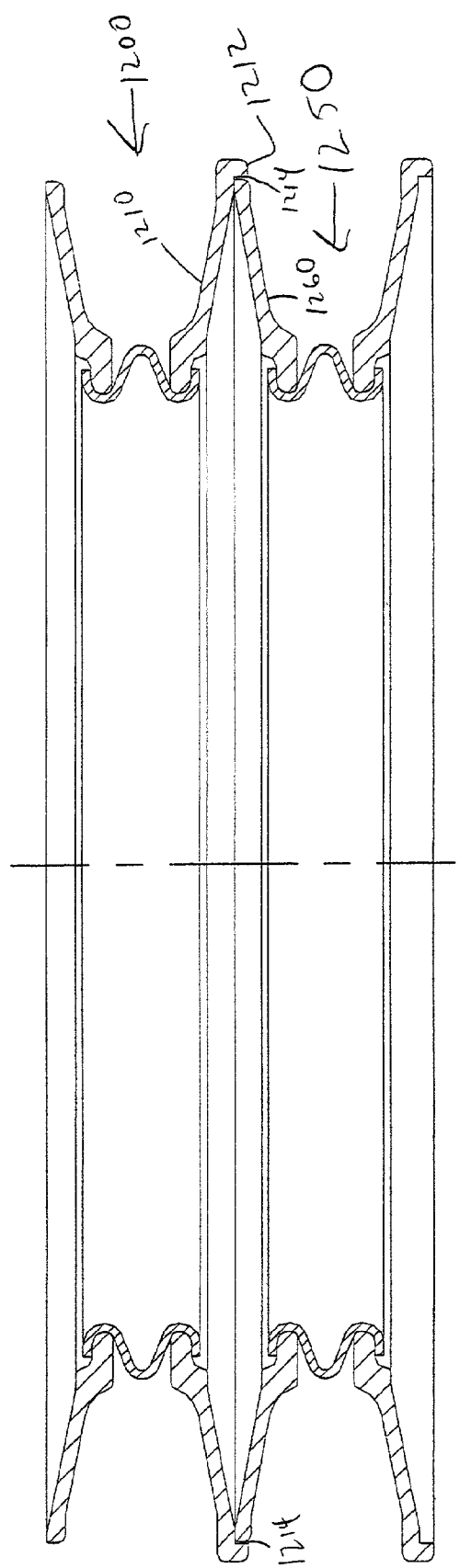
FIG. 17 is an embodiment of two adjustable disc spring systems connected by a disc spring of a first disc spring system engaging a ledge of a disc spring of a second disc spring system, in accordance with the present invention.

1250, as depicted in FIG. 17. A bottom disc spring 1210 of disc spring system 1200 includes an axially projecting tip 1212 which forms a lip 1214 substantially parallel to an axial direction. Second disc spring system 1250 includes a top disc spring 1260 which may be received on lip 1214. Thus, first disc spring system 1200 may be stacked with second disc spring system 1250 to provide flexibility in an amount of deflection when used in a restricted space, for example, a cylinder (not shown), and to prevent relative radial slippage between systems. When top disc spring 1260 is received by lip 1214, top disc spring 1260 may be inhibited from moving in an axial direction toward first disc spring system 1200 while bottom disc spring 1210 may be inhibited from moving in an axial direction toward disc spring system 1250. Thus, any failure caused by first disc spring system 1200 or second disc spring system 1250 slipping relative to one another may be inhibited or prevented.

Numerous alternative embodiments of the present invention exist. For instance, the disc springs described above may be utilized as sealing elements for various axial seal requirements. Frequently, such seals for static (i.e. non-rotating) or dynamic (i.e. rotating) applications require that seal elements thereof have significant flexibility which may be provided by the disc springs and adjustable spacers described above. For example, the disc springs may be pre-coated with a sealant before assembly or they may be coated after assembly of the disc spring systems. Such coatings may be a soft compliant material, such as butyl rubber. Also, the coatings could be Teflon or a soft metal such as gold or silver. In a further example, ends of the disc springs described above may be relatively sharp and hard at their outer diameters such that a seal might be formed by imbedding the disc spring ends into flanges being sealed (not shown), for example.

Further, the disc springs and adjustable spacers described above could be formed in any shape or size to allow resiliency, adjustability, and compression in any desired direction, when received in any number of restricted spaces, as will be understood by those skilled in the art. Also, the adjustable spacers described above may be adapted to receive only one disc spring while ends of the adjustable spacer opposite the disc spring may be adapted to engage different surfaces or objects, as will be understood by those skilled in the art.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A method of adjusting a disc spring system comprising:
    axially aligning at least one beveled disc spring with an adjustable spacer; and
    compressing the adjustable spacer in a substantially axial direction relative to said at least one beveled disc spring to plastically deform the spacer.

2. The method of claim 1 further comprising inserting the at least one beveled disc spring into at least one entrapping flange of the adjustable spacer.

3. The method of claim 1 wherein the compressing the adjustable spacer comprises placing an axial force on the at least one beveled disc spring.

4. The method of claim 1 wherein the at least one beveled disc spring comprises at least one Belleville washer.

* * * * *